United States Patent [19]

Eubank

[11] 4,320,607
[45] Mar. 23, 1982

[54] COMBINATION FLOOR, JACK AND TRAILER ASSEMBLIES

[76] Inventor: Marcus P. Eubank, P.O. Box 7576, Longview, Tex. 75602

[21] Appl. No.: 107,506

[22] Filed: Dec. 27, 1979

Related U.S. Application Data

[63] Continuation-in-part of Ser. No. 949,675, Oct. 10, 1978, and Ser. No. 932,914, Aug. 11, 1978.

[51] Int. Cl.³ ............................................. E04H 1/12
[52] U.S. Cl. ........................................ 52/143; 52/126; 52/223 R; 52/602
[58] Field of Search ............ 52/79.1, 143, 172, 79.14, 52/126, 223, 602; 254/89 H; 280/404

[56] References Cited

U.S. PATENT DOCUMENTS

| | | | |
|---|---|---|---|
| 3,473,273 | 10/1969 | Gunkel | 52/79.1 |
| 3,697,098 | 10/1972 | Fisher | 52/143 |
| 3,831,327 | 8/1974 | McCrillis | 52/79.1 |
| 3,877,187 | 4/1975 | Livingston | 52/143 |
| 3,884,494 | 5/1975 | Ashby | 52/143 |
| 3,944,242 | 3/1976 | Eubank | 52/143 |

FOREIGN PATENT DOCUMENTS

| | | | |
|---|---|---|---|
| 1562963 | 3/1969 | France | 52/143 |
| 38458 | 9/1955 | Poland | 52/143 |

Primary Examiner—Price C. Faw, Jr.
Assistant Examiner—Henry F. Raduazo
Attorney, Agent, or Firm—James C. Fails

[57] ABSTRACT

A combination floor, jack and trailer assemblies characterized by a precast floor assembly having a pair of longitudinal beams and a plurality of transverse beams, including end beams, the longitudinal and end beams forming underpenning for a modular home; a jack assembly for attaching to said floor assembly even at ground level and for lifting said floor assembly sufficiently for the running thereunder of a trailer assembly, the jack assembly having a superstructure, lift bar for lifting the superstructure and the attached floor assembly, top fastener for fastening the lifting bar to prevent upward movement, interconnection means for connecting the jack with the floor assembly, extensible leg having a plurality of stations therealong for fastening the base along the leg and a jack for raising the floor assembly by forcing the extensible leg and the lift bar apart by one or more cycles so that the trailer assembly can be run underneath; and a trailer assembly including front and rear units having respective frames mounted on tandum wheels and respective tongue hingedly connected to the front unit. Also disclosed are specific structural details of preferred embodiments of the floor assembly, jack assembly and the trailer assembly.

14 Claims, 16 Drawing Figures

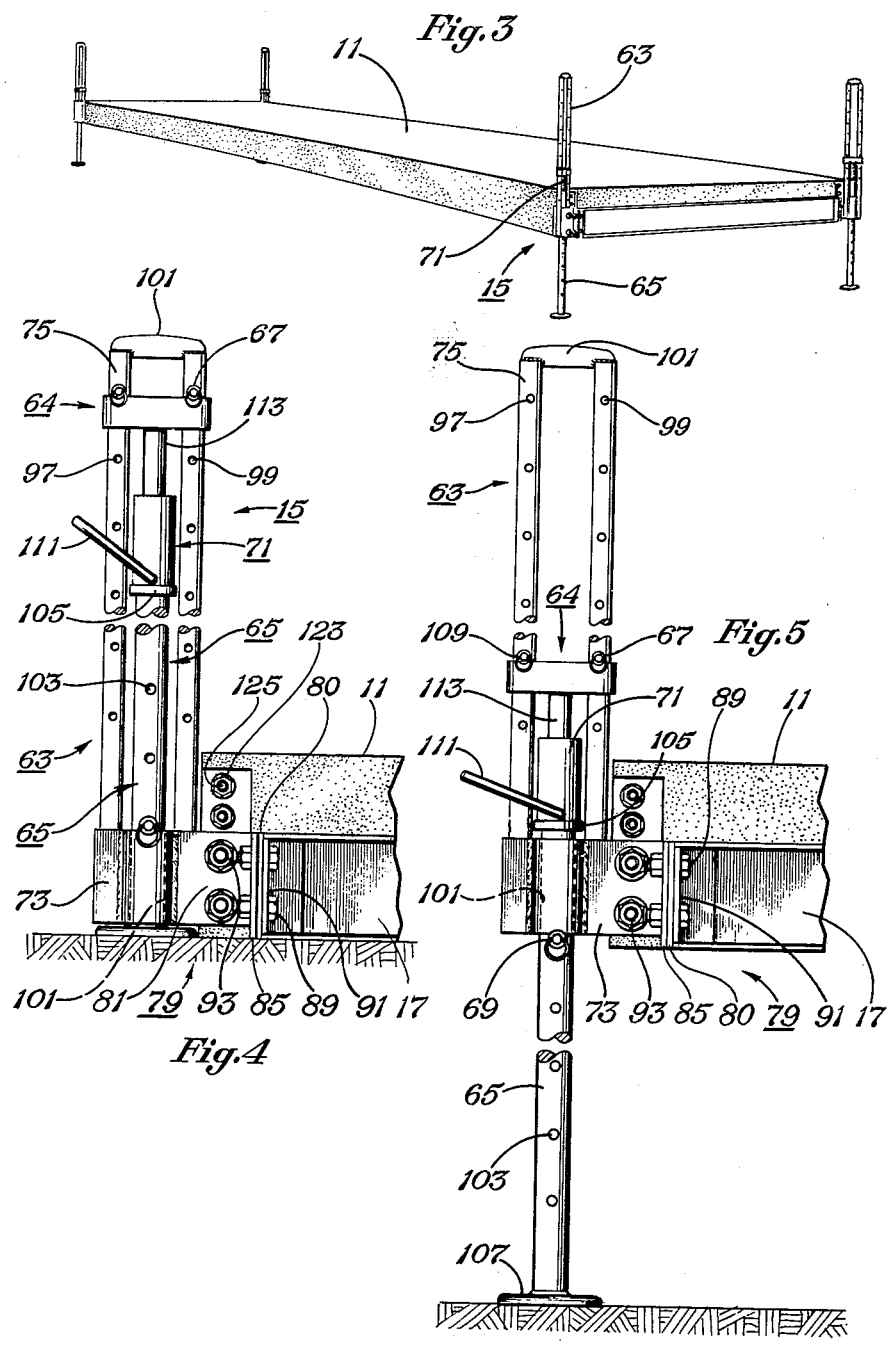

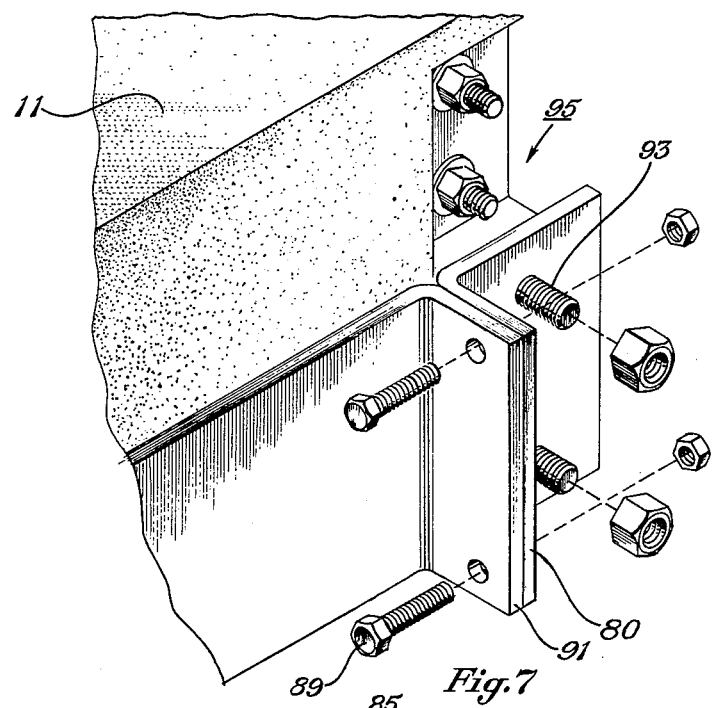
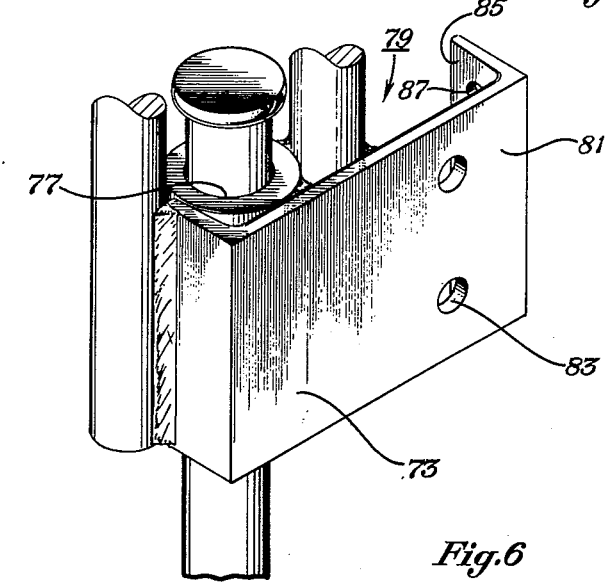

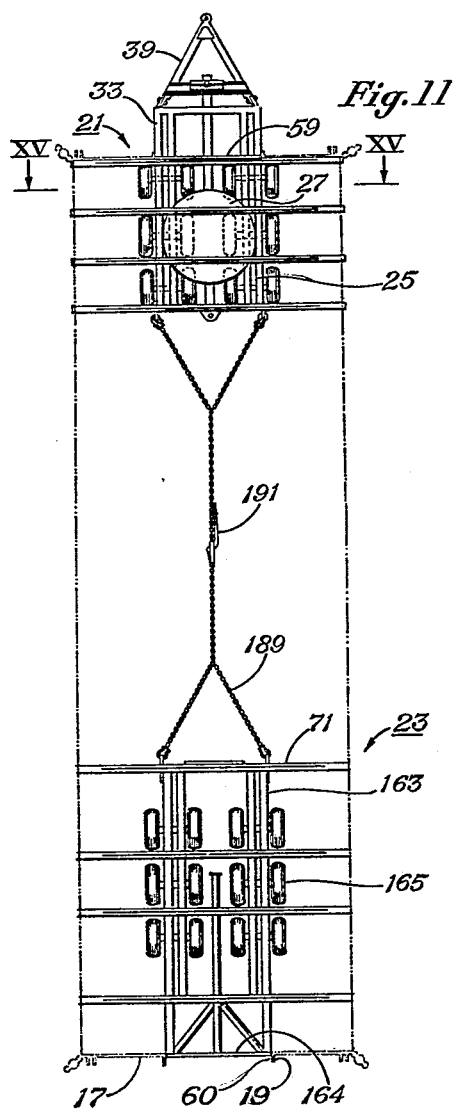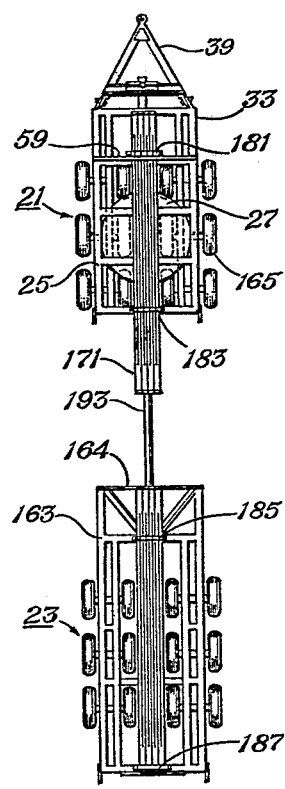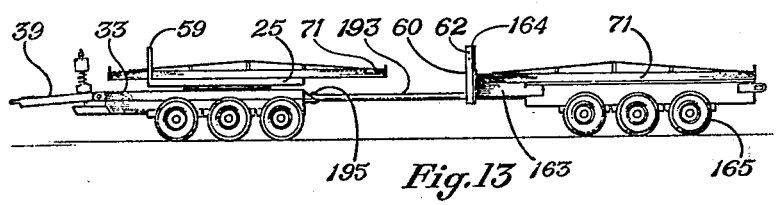

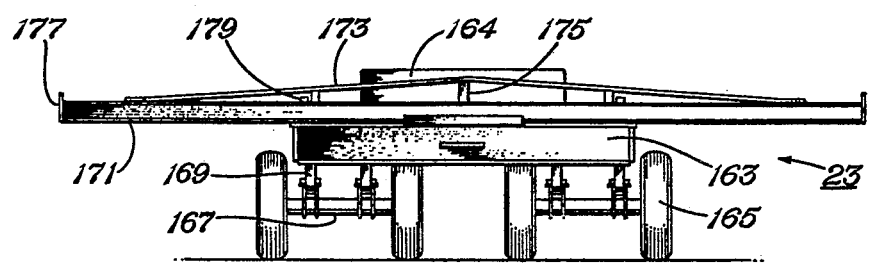
Fig.14
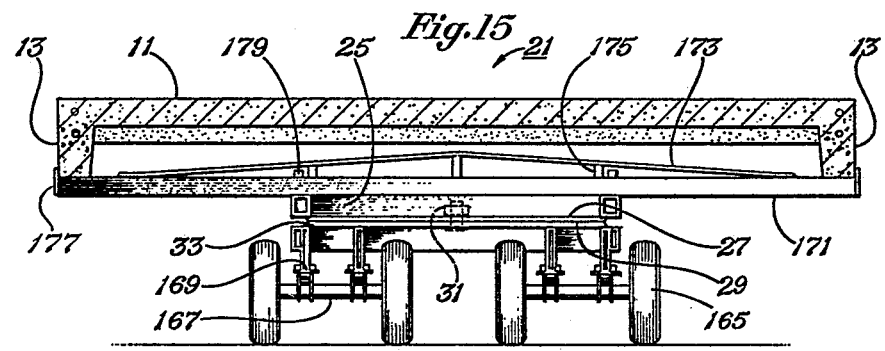
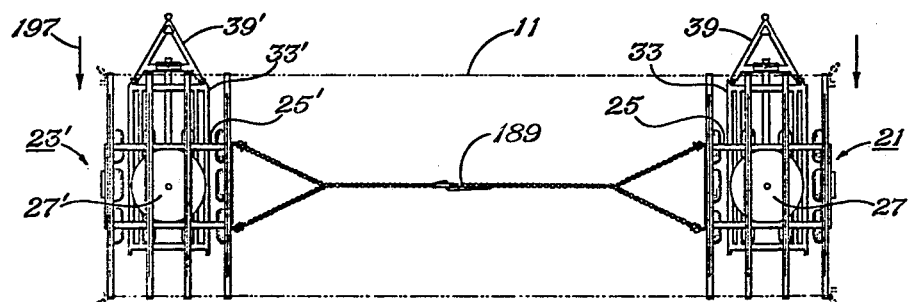
Fig.16

COMBINATION FLOOR, JACK AND TRAILER ASSEMBLIES

CROSS REFERENCE TO RELATED APPLICATIONS

This is a continuation in part application of my co-pending applications Ser. No. 949,675 entitled JACK, filed Oct. 10, 1978 and Ser. No. 932,914 entitled TRAILER ASSEMBLY FOR CARRYING OVERWIDTH LOADS, filed Aug. 11, 1978.

FIELD OF THE INVENTION

This invention relates in general to a combination facilitating building of modular homes. More particularly, this invention relates to a precastable floor assembly, jack assembly for raising the floor assembly and a trailer assembly for transporting the floor assembly; particularly, where the floor assembly is made of stressed concrete and the like.

DESCRIPTION OF THE PRIOR ART

In my issued U.S. Pat. No. 3,944,242, the descriptive matter of which is incorporated herein by reference, the prior art with respect to mobile homes and such other modular homes is set forth. A noted therein, the typical construction includes lightweight steel beams with webbed, lateral support and a light-weight floor of wood or other composite material. Normally a subfloor may enclose wiring pipes, ducts and the like or provide a heating and cooling duct itself. Therein also is set forth the disadvantages of having to affix with costly labor the respective elements and materials together to form the floor for such modular homes. Another disadvantage is the lightweight structures of such homes which enable them to be blown over easily if they are not anchored by guy-wires or the like. Moreover, the beams do not ordinarily come in contact with the ground and necessate further underpinning about the modular home, at additional expense. The prior art has shown concrete beams that taper toward the center but do not alleviate problems with the rocking of the modular home or requiring supplemental underpinning.

Because the precast floor assemblies are exceptionally heavy, special jack assemblies and trailer assemblies are required to lift the floor assembly to the proper level and allow insertion of the trailer assembly thereunder and connect trailer assembly and transport the floor assembly to one or more locations, as for home assembly and final homesite. The prior art with respect to jack assemblies is set forth in my co-pending application Ser. No. 949,675, now U.S. Pat. No. 4,206,906, entitled JACK, filed Oct. 10, 1978, the descriptive matter of which is incorporated herein by reference for details that are omitted herefrom. As noted therein, the prior ar jacks have required objects with a predetermined minimum height to get the jack under them and were limited in the maximum heights to which the objects could be raised. Moreover, these jacks blocked ingress and egress beneath a floor assembly and would not have allowed a trailer assembly to be put under the floor assembly that is being held to the predetermined height by the jacks.

The prior art with respect to the trailer assemblies is set forth in my co-pending application Ser. No. 932,914, now U.S. Pat. No. 4,200,305, entitled TRAILER ASSEMBLY FOR CARRYING OVERWIDTH LOADS, filed Aug. 11, 1978, the discriptive matter of which is incorporated herein by refernce for details that are omitted herefrom. As set forth therein, the wide variety of wheel assemblies that have been employed and proposed in the prior art were inadequate. Normally a pair of longitudinal steel beams provided support with tandem wheels located at the front and rear ends. On the other hand, the front end may have a fifth wheel hitch assembly for mounting on the back of a tractor or the like. These types of trailers capable of carrying large loads were difficultly removable if at all and were unsatisfactory in trying to emplace heavy bulk loads such as prefabricated floor assemblies and/or homes thereon, at a desired location, such as in a lot of close dimensions.

From the foregoing, it can be seen that the prior art has not provided a combination comprising a satisfactory floor assembly having the desired stressing to prevent cracking if precast in one piece, lifted and transported; having the respective jacks for lifting the floor assembly; and/or trailer assembly for transporting the floor assembly.

SUMMARY OF THE INVENTION

It is a general object of this invention to provide a precastable supporting structure including floor and bracing for a modular home that is economical in cost and construction, to provide a jack that can be employed to raise the floor assembly from ground level to a desired height and an improved trailer assembly that will haul the floor assembly, even if overwidth.

It is another object of this invention to provide the supporting structure for a modular home that is sufficiently rigid and heavy that anchoring is not required while stationary yet still adapted to be transported without cracking; and provide jacks that enable jacking up the floor assembly to a sufficient height to emplace either a trailer or another modular room therebeneath, the jacks being inexpensive enough that four jacks can be employed at the respective corners of the floor assembly for holding it at the predetermined height until ready to be let down on a receiving object therebeneath.

It is another object of this invention to provide the supporting structure for a modular home that is sufficiently rigid and heavy that anchoring is not required while stationary yet still adapted to be transported without cracking; and provide an improved trailer for hauling the floor assembly to provide support at both front and rear ends and is of sufficiently low height as to be moveable down a public transportation highway or the like.

It is a specific object of this invention to provide an overwidth floor and bracing for the supporting structure of a modular home of precastable materials such as concrete with an improved jack that can be employed for raising the floor assembly yet be operated by a single workman and an improved trailer assembly that will haul the floor assembly yet convert to a legal width when empty.

These and other objects will become apparent from the descriptive matter hereinafter, particularly when taken in conjunction with the appended drawings.

In accordance with one embodiment of this invention there is provided a combination comprising a prefabricated floor assembly that is adapted to be fabricated at a first location and transported to a second and subsequent location; a jack assembly for raising the prefabricated floor assembly to any desired height, such as for emplacing a trailer assembly therebeneath for transport; and an improved trailer assembly for transporting the prefabricated floor assembly.

In accordance with another embodiment of this invention there is provided a subcombination of a prefabricated floor assembly that can be fabricated at a first location and raised to a desired height; and a jack assembly for raising the floor assembly to the desired height such as for stacking modular condominium units or the like.

In accordance with another embodiment of this invention, there is provided a subcombination of a prefabricated floor assembly adapted to be fabricated at a first location and transported to a second and subsequent location and an improved trailer assembly for transporting the floor assembly down a public transportation way and return.

In this embodiments, the prefabricated floor assembly comprises an integrally pre-cast substantially planar top having peripherally extending beams at the extremities to form underpinning, per se, so as to be set on level ground and define a space below the floor, the space being adapted to serve as a heat source or sink. The floor is usually overwidth; that is, so wide that a special permit is required to haul it on a public highway. Preferably, longitudinally extending cables are embedded in the longitudinal beams and post cast tensioned to support the center of the floor assembly when the respective ends are lifted and carried. Respective high strength members are affixed to each end of the floor assembly for jacking and transporting. Each of the high strength members has a first portion of a jack interconnection means and a first portion of a trailer interconnection means for connecting, with respectively, the jacks and the trailer assembly.

In the embodiments of this invention, the jacks comprise a superstructure that includes a base adapted to sit at ground level and having a downward passageway for a leg means; and a structurally strong member having a plurality of stations at a plurality of respective predetermined heights therealong for preventing movement upwardly along the member of a lifting means, the structure or strong member being connected to the base. Each jack includes a lifting means for liting the superstructure and the floor assembly if attached thereto; the liftng means comprising a cross piece that is moveable longitudinally of the strong member of the superstructure; top fastening means for fastening the lifting means so as to prevent upward movement past the predetermined station on the superstructure; and second portion of jack interconnection means for connecting the superstructure with the floor assembly; the second portion of the jack interconnection means being connected with the superstructure and having means for removably connecting with the floor assembly. Each jack also includes extensible leg means for extending downwardly from the superstructure; the leg means being slidably disposed in the passageway penetrating through the base; the leg means having a plurality of stations at a plurality of respective heights therealong; the leg means having a force pad means for receiving a jacking force at the top; and bottom fastening means for fastening the base at a predetermined station along the leg to prevent movement of the base downwardly along the leg means past the the predetermined station. The top and bottom fastening means are alternately operable to a plurality of different stations for jacking the floor assembly to the predetermined height. Jacking means is provided for effecting raising of the object, the jacking means being adapted for positioning between the force pad means on the leg means and the lifting means for applying a jacking force to force the two apart longitudinally of the superstructure. Thus, the floor assembly can be raised by extension of the leg means through at least one cycle of fastening the lifting means and jacking downwardly on the leg means against the lifting means and fastening the superstructure along the leg means. The jacks allow raising the floor to a wide variety of heights, as for stacking modular condominiums, apartments and the like or for emplacing on a trailer assembly.

In the embodiments of this invention, the trailer assembly comprises two separate units, a front unit and a rear unit. Each unit has a frame mounted on a set of wheels, thus the load is supported both at the front and rear. The units can be moved independently of each other, but are linked by the load and a chain when loaded. The front unit has an upper and lower frame rotatably mounted to each other, allowing the lower frame and and attached wheels to turn with respect to the upper frame. The tongue is connected to the lower frame and to the towing vehicle. The tongue is vertically pivotal with respect to the frame and has a compression device for applying weight to the end of the hitch for compressive connection with the towing vehicle, as for transferring weight, better interconnection and traction. Cross members are mounted to the frame of the units and extend laterally outwardly past the edges of the wheels. These provide support for the load and are reconfigured for empty or return trips. In one embodiment, the wheels of the rear unit do not have the capacity to turn with respect to the load. In an alternate embodiment, however, a rear unit the same as or similar to the front unit is used allowing both the wheels on the front and rear units to turn for a lateral movement of the floor assembly, as for emplacing in a close fitting space; or to allow towing in either direction via tongues at respective opposite ends.

BRIEF DESCRIPTION OF DRAWINGS

FIG. 3 is a perspective view of the jack being employed to raise the floor assembly, as for being emplaced on a trailer.

FIG. 4 is a partial elevational view showing one corner of the modular floor and frame assembly showing the jack attached at ground level.

FIG. 5 is an elevational view of the jack of FIG. 4 with the leg extended, raising the modular floor and frame assembly.

FIG. 6 is a partial isometric view of the base of the jack of FIG. 4.

FIG. 7 is a partial isometric view of the corner of a floor and frame assembly with the strong member adapted for being connected to the base of FIG. 6.

FIG. 11 is a top plan view of the trailer assembly of FIG. 1 with the floor assembly shown in phantom.

FIG. 12 is a reduced top plan view of the trailer assembly of FIG. 1 with the assembly being shown in the unloaded return trip position.

FIG. 13 is a side elevational view of the trailer assembly of FIG. 1 with the assembly being shown in the unloaded return trip position.

FIG. 14 is an end elevational view of the rear unit of the trailer assembly of FIG. 1.

FIG. 15 is a sectional view of the trailer assembly of FIG. 1 taken on the line XV—XV of FIG. 11.

FIG. 16 is a reduced top plan view of an alternate embodiment of the trailer assembly of FIG. 1 as for emplacing the floor assembly laterally into a close fitting space.

DESCRIPTION OF THE PREFERRED EMBODIMENTS

Figures 1, 2:
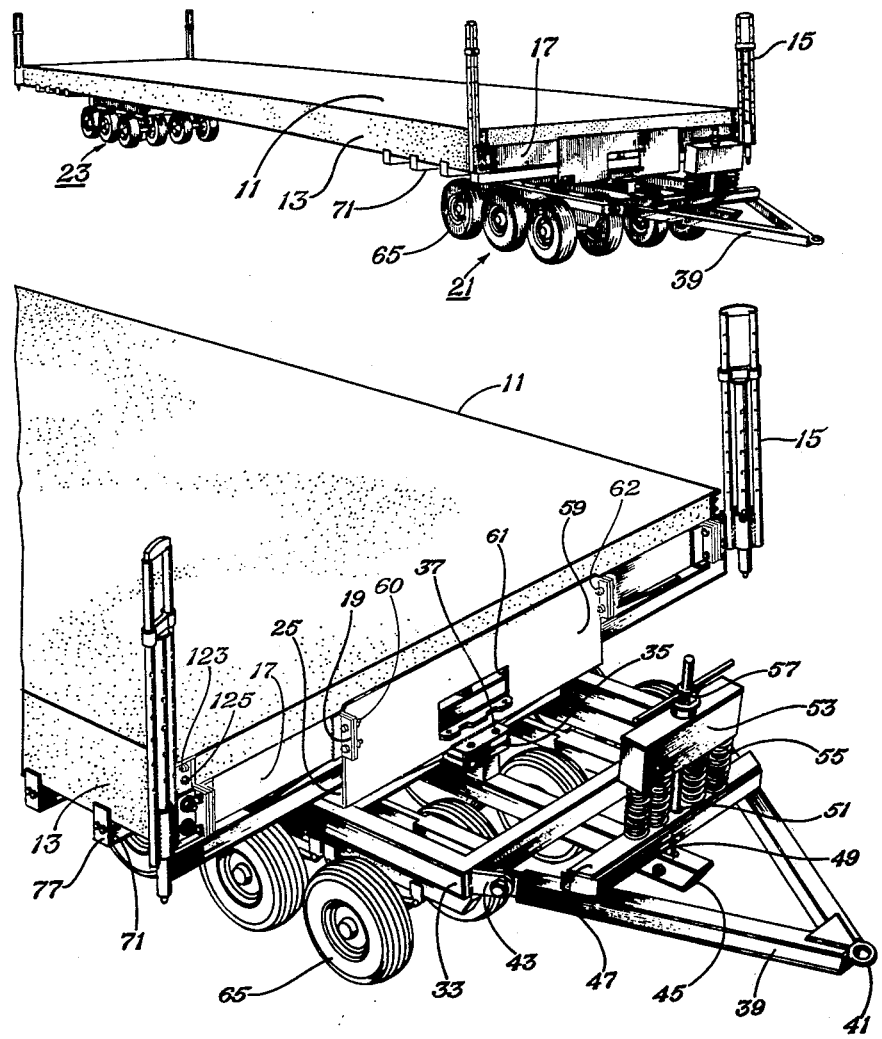
FIG. 1 is a perspective view of a trailer assembly, modular floor and frame, and the jacks installed at each corner of the floor and frame assembly.
FIG. 2 is an enlarged perspective view of the front of the trailer and frame, showing the details of the attachment of the jack.

Referring to FIGS. 1 and 2, the trailer assembly is shown carrying the floor assembly 11, a single precast piece of concrete with longitudinal beams 13 formed on the side edges and with jacks 15 mounted on each corner for raising and lowering the floor assembly 11. A high strength member or plate 17 is bolted to the front and rear of the floor assembly 11.

The undercarriage, or trailer assembly for carrying the floor assembly 11 includes a front unit 21 and a rear unit 23. As discussed in the hereinbefore referenced co-pending application Ser. No. 932,914, the front unit has a generally rectangular upper frame 25 that has a circular plate serving as a "fifth wheel" secured by a bolt.

A pair of mating tabs 35 extend forwardly from the upper and lower frame 25, 33 and contain apertures 37 for receiving pins to lock the frames together if desired. Tow bar, or tongue, 39 is hingedly connected to the front end of the lower frame 33. The tongue 39 is vee-shaped having two legs that converge into a ring 41 that serves as a hitch for connection to a two vehicle. The two vehicle will have a mating pintle (not shown). Each leg of the tongue 39 is connected to lower frame 33 by hinge 43. The hinges 43 allow the tongue to pivot vertically with respect to the horizontal frame 33 but not horizontally.

A compression means urges the tongue 39 downwardly so that the hitch 41 will apply weight to the two vehicle. Weight is applied for various purposes. The compression member includes beam 45 rigidly attached to the lower frame 33 and extending forwardly beneath the tongue 39. Transverse member 47 is secured across the legs of the tongue 39 above beam 45. A threaded rod 49 is pivotally connected to the end of the beam 45. It extends vertically through an aperture 51 in transverse member 47, and through a second aperture in a plate or housing 53 carried above the transverse member 47. Four coil springs 55 are carried between the housing 53 and the transverse member 47. A nut 57 with handles is threaded to rod 49 and bears against the top of housing 53. Tightening nut 57 lowers housing 53. Depending on where the housing 53 is positioned the springs 55 are compressed to apply a force downwardly on the tongue while in tow.

A vertical plate 59 is secured to upper frame 25. Its width is selected to fit within the spaces between flanges 19 on member 17 to prevent lateral shifting of the floor assembly. The floor assembly 11, with its protective plate 17, bears against the plate 59. The plate 59 has a rectangular opening 61 in its lower center.

A tab, or flange, 60 is provided on the plate 59. The tab 60 and the flange 19 include aligned holes for receiving bolts 62 for bolting the floor assembly 11 to the front and rear units 21, 23 of the trailer assembly in order to comply with the law and affix respective floor assembly and trailer assembly together for traversing a public highway or the like. Expressed otherwise, bolts 62 are emplaced through apertures in the respective flanges and tabs 19, 60 to fasten the trailer assembly and the floor assembly into a unitary enity for being towed to a site. A similar arrangement is provided on the rear of the floor assembly 11 for connecting with the rear unit 23.

The rear unit 23 includes a suitable frame 163 that will be described in more detail later hereinafter with respect to FIGS. 11 et seq. Respective rectangular tubular cross members are provided on both the front and rear units and are adapted to be turned crossways for receiving the floor assembly 11 and to be oriented longitudinally for a return trip. The operational description of the trailer configurations for carrying the floor assembly 11 and returning empty will be described also in more detail with respect to FIGS. 11-16 later hereinafter. It is believed helpful at this point to consider the jacks and the construction of the corners of the floor assembly that enable emplacing the trailer beneath the floor assembly.

The jacks 15, FIG. 4, can be emplaced at ground level and connected with the floor assembly 11 and extended to lift the floor assembly 11 to the desired height, FIGS. 3 and 5.

At each corner of the floor assembly 11 there is provided a jack interconnection means 79. The jack interconnection means 79 comprises as a first portion elongate bolts that are embedded in the cast floor assembly 11 with protruding threaded sections that fit through mating apertures on the jack to receive nuts. These bolts also hold in place a structurally stong flange 80 against which the structurely strong plate 17 can be butted and affixed as will become more clearly apparent from descriptive matter hereinafter.

Each jack 15, FIG. 4, includes a superstructure 63, a first portion of the jack interconnection means 79, a lifting means 64, a leg means 65 that is extensible, a top fastening means 67, a bottom fastening means 69, and jacking means 71.

The superstructure 63, FIGS. 4 and 5, includes a base 73 and structurally strong member 75 connected to the base and extending upwadly therefrom in operation. The base 73, FIGS. 4–6, is adapted to sit at ground level and has a passageway 77 for slidably receiving the leg means 65. The base 73 is made out of structurally strong material such as steel. In the illustrated embodiment, the base is connected with the floor assembly 11 slightly above ground level so that it does not require a recess to receive a foot or the like on the leg means. If desired, there may be a recess of small proportion from the bottom of the base to receive the foot top and still allow a attachment at ground level by the jack interconnection means 79.

The jack interconnection means 79 also comprises as a second portion laterally extending, structurally strong tab 81, FIGS. 4 and 6. As can be seen in FIG. 6, the tab 81 has apertures 83 for receiving bolt means for connecting the tab 81 with the floor assembly 11. As illustrated, the tab 81 also includes a flange 85 having a pair of apertures 87 for receiving side bolts. As can be seen in FIGS. 4 and 5 the side bolts 89 are connected through the flange 85, flange 80 and mounting bracket 91 on the strong member 17 so as to hold it on the respective ends of the floor assembly 11. Similarly, bolts 93 are connected with the mounting bracket on the floor assembly 11 and tab 81 of the base 73 of the jack 15. FIG. 7 also illustrates that the bolts 89 and 93 can connect through the flange 80, and mounting bracket 91, as well as the on the jack 15. If desired, the entire corner assembly 95, FIG. 7 can be cast into the precast floor and frame assembly 11 as it is being formed.

The superstructure 63 also includes the strong member 75. As illustrated, the strong member 75 comprises twin upwardly extending members in a pseudo-bail arrangement. The bail member 75 is connected to the base so as to be rigid therewith. Specifically, if desired, the respective legs of the bail members 75 may be screwed into a fitted aperture in the base, be welded to the base or otherwise rigidly affixed thereto.

In any event, the bail member 75 has a plurality of stations at a plurality of respective predetermined heights for preventing a movement upwardly along the bail member of the lifting means 64. As illustrated, the respective stations comprise matched apertures 97, 99, FIGS. 4, 5 defining each station. The bail members 75 comprise high strength steel tubing in the illustrated embodiment, connected with a top member 101. The connection may be by a welding or other suitably rigid interconnection. In the illustrated embodiment in which the superstructure is only about four feet in length, the members may comprise one and one half inch to two and one half inch steel tubing and obtain satisfactory results. Other structurally strong material such as magnesium and aluminum may be employed, but it has been found preferable to employ the tougher and more economical metal such as steel. Obviously, more exotic material such as titanium could be employed but there is no need to do so in this invention.

Thus it can be seen that the apertures 97, 99 serve as their respective stations at which can be affixed, or stopped, the lifting means 64.

The lifting means 64 comprises a cross-piece that is movable longitudinally of the superstructure; but is able to be stopped in its upward movement by respective top fastening means 67. As illustrated, lifting means 64 comprises a cross-piece having apertures at each end that slidalby encompass the two members 75 of the superstructure. The lifting means 64 may be formed of any structurally strong material. As illustrated, it is preferably formed of the same material, such as steel, as the superstructure 63 of the jack 15. Lifting means 64 serves as a means for lifting a support structure and the floor assembly 11. The lifting means 64 serves as a lifting plate for lifting the floor assembly 11 when a jacking force is exerted against the lifting plate and against the extensible leg means 65.

The leg means 65 is slidably disposed in the passageway 101 longitudinally through the base 73. The leg means 65 and the walls of the passageway 101 fit comformably close to minimize any wobble, or lateral movement between the two. The leg means 65 is provided for extending downwardly from the superstructure 63. The leg means 65 has a plurality of stations at a plurality of respective heights in operation along the leg means. Similarly as described hereinbefore with respect to the superstructure 73, the respective stations comprise apertures 103, FIG. 5, along the leg means. Expressed otherwise, the apertures 103 serve as bottom fastening means for preventing downward movement of the base along the leg means and for holding the floor assembly 11 at a predetermined attained station.

The leg means 65 has a force pad means 105 for receiving a jacking force without damage to the top of the leg means 65. The leg means 65 also has a foot 107 for spreading the load over a larger bearing surface. Spacing allows putting a plate under the leg or foot. In any event the foot or even larger plate allows minimizing the tendency to dig into the surface or impose high stresses with the heavy loads of the floor assembly 11.

The leg means 65 may take any simple form that is extensible and has the desired structural strength. The forms may be square beams, I-beams, L-members, U-channels or the like. As illustrated, the leg means 65 comprises a tubular high strength steel member where the tubular cross section is circular. The sizes may range through a variety of sizes in accordance with conventional structural engineering load design. As illustrated in the embodiment in which leg means is about four feet in length, the leg means comprises $2\frac{1}{2}$ high-strength structural steel tubing. Obivously, smaller size tubing could be employed if the load is to be less than the 30,000–70,000 pound load for the modular floor and frame system 11. Conversely, the leg means can comprise stronger structure if the floor assembly is to be heavier.

In the foregoing it can be seen that the lifting means 64 and extensible leg means 65 serve as means for raising the floor assembly 11, along with the superstructure, and fastening it at a plurality of respective stations by the respective top and bottom fastening means 67, 69.

The top fastening means 67 comprises pins, or pin shafts, 109 that are readily inserted through the apertures 97, 99 and protrude beyond the dimensions of the superstructure member 75 for blocking upward movement of the lifting means 64 when emplaced at a given station. As illustrated, the pins 109 are simple solid steel pins designed to easily slip through the apertures 97, 99. If desired and preferably, the respective pins, or pin shafts, 109 have ends that are tapered to facilitate insertion through the respective apertures.

Other fastening means that are commensurate with the design of the respective stations could be employed, but the pin shafts have proven to be economical, esaily inserted and removed and almost ideal for this application.

Similarly, the bottom fastening means 69 comprise pin shafts of solid metal, such as steel. Both the top and bottom fastening means are, of course, structurally adquate to maintain the loads to which they will be subjected. Ordinarily, the bottom fastening means 69 comprise larger pin shafts since a single shaft must bear the entire load, whereas the top fastening means comprise two pin shafts. The bottom fastening means also preferably has tapered ends to faciliatate insertion and removal through the aperture 103.

Similarly as described with respect to the top fastening means 67, bottom fastening means 69 may comprise any design compatible with the respect to stations along the leg means 65. The respective fastening means serve as stops against which can be exerted a force equal to the weight of the floor assembly, or its proportionate share; such as, one-fourth the total weight, or the weight of one corner. The force may be the upward force against the lifting means 64 by the jacking means 71, for example.

The jacking means 71 is provided for effecting the raising of the object. Jacking means 71 is adapted to be positioned between the force pad means 105 of the leg means 65 and the lifting means 64 for applying a jacking force to force the two apart longitudinally of the superstructure. Since the leg means is pressing against a firm surface, such as surface of the earth, the net effect is to lift the floor assembly 11. The jacking means 71 may comprise any of the force generating means; including but not limited to screws, scissors, hydraulic or pneumatic jacks, manual or powered. The jacking means 71 employs a hydraulic ram to force apart lifting means 64 and the leg means 65 for raising the floor assembly 11. Specifically, as illustrated, the jacking means comprises a hydraulic jack that can be operated by way of a handle 111. As the handle is moved upwardly and downwardly at its exterior end, the hydraulic force is applied to the extensible rod end 113 of the piston (not shown) interiorly of the jack. Consequently, the superstructure 63 is lifted with respect to the leg means 65. Since the floor assembly 11 is attached to the superstructure, it is lifted with respect to the surface against which the foot is 107 of the leg means 65 sits.

Figure 8:
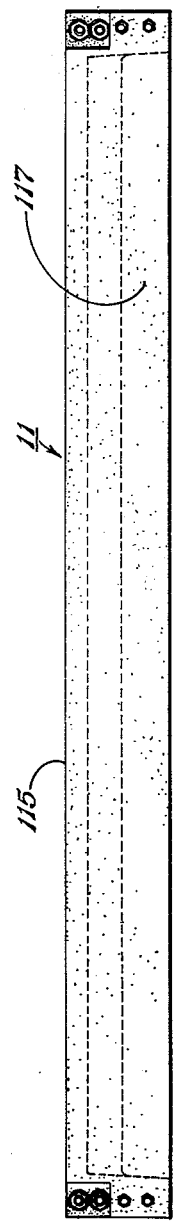
FIG. 8 is an end view of the floor assembly.
Figure 9:
FIG. 9 is a longitudinal side view of the floor assembly of FIG. 8.
Figure 10:
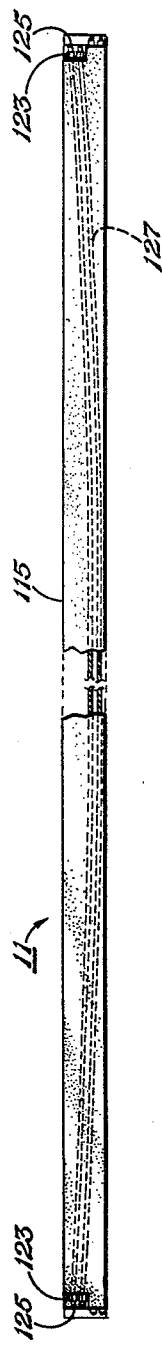
FIG. 10 is a longitudinal view of the floor assembly showing the cast in place cables for structurely supporting the center thereof.

As illustrated in FIGS. 8–10 the floor assembly 11 is preferably formed of stressed concrete or similarly castable material and comprises a top 115, end beams 117, side beams 119, FIG. 9, and laterally extending beams 121. The laterally extending beams may be at one or more angles; such as 90°, 45°, or any desired angle; with respect to the longitudinal axis of the floor assembly 11.

The top 115 is substantially planar and has length and width of predetermined dimensions. The top is integrally cast with a plurality of laterally extending beams 121 for structural strength.

The two main longitudinally extending side beams 119 are integrally connected to the top and the laterally extending beams, as by being precast together. The two side beams 119 have substantially uniform height throughout their length and are located at the outside width of the top 115. The side beams 119 extend below the top and the laterally extending beams 121 so as to be set on the ground level and define a space below the top and the laterally extending beams without requiring additional underpinning or the like.

The end beams are integrally connected to the top 115. The two end beams have the same substantially uniform height throughout their length as the side beams 119 so as to define a peripheral underpinning when set on level ground and define a space beneath the top and the laterally extending beams intermediate the end beams.

A plurality of longitudinally extending cables 123, FIG. 10, are embedded in the longitudinal beams. The cables are cast into the beams and are tightened in tension after the floor assembly has cured the sufficient predetermined time interval, such as forty-eight hours to seventy-two hours. The cables sag toward the center before the beams are cast in place and cured such that when they are post-cast-tensioned they support the center of the floor when the respective ends are lifted and carried.

The floor may be formed by casting of a structure similar to that illustrated and described in my U.S. Pat. No. 3,944,242, referenced hereinbefore; with the exceptions as noted above. Specifically, as can be inferred from the foregoing, the longitudinal and end beams have a greater height than the transverse, or laterally extending beams 121. The floor may be only four to six inches in height measuring the top of the floor to the bottom of the laterally extending beams; with the floor, per se, being only two to four inches in thickness. Ordinarily the floor will be reinforced with conventional wire mesh or reinforcing bars.

The longitudinally extending beams 119 are tensioned after pouring and curing of the concrete, as described hereinafter.

The floor assembly may be prepared as described in my U.S. Pat. No. 3,944,242. Specifically, a bed is enclosed by a frame of suitable dimensions. The bed may have suitable molds emplaced for obtaining the desired integral structure of the peripheral side and end beams as well as the intermediate longitudinally extending beams. A frame will be formed of pivotally fastened portions that are operated by hydraulic rams responsive to high pressure hydraulic fluid to break the forms away from the cast floor assembly 11.

If desired, templates for water and drainage pipes and heating and airconditioning ducts may be placed in position or may be cast in place into the floor.

To prevent bonding between the concrete and the mold surfaces, all the surfaces to remain unbonded are covered with a hydrophobic bond breaker. This may be done by spraying with a solution of oil containing paraffin wax or other hydrophobic materials. Moreover, spreading of any material that will prevent bonding, such as polyethylene plastic is suitable.

As indicated, the beams are tensioned after pouring and curing. Tensioning is achieved by either conventional prestressing procedures or by post tensioning. The former do not require discussion, since they are well known. Post tensioning is achieved by tightening of the nuts 123 on bolt tendons 125, FIGS. 2, 4 and 10. The bolt tendons are connected with the cables by suitable means such as welding, compression soldering, and the like, as described in my hereinbefore referenced U.S. Pat. No. 3,944,242.

If desired, lifting eyes can be emplaced in the floor assembly to facilitate lifting it from its molds by a crane or the like. On the other hand, the jacks can be affixed for lifting if desired.

In any event, the floor assembly must be lifted to be emplaced on the trailer assembly; for example, between the vertical plates on the front and rear units 21, 23.

The trailer assembly includes, as indicated hereinbefore, in addition to front unit 21 the rear unit 23. The rear unit 23 also has a vertical plate 164 that includes a flange 60 having apertures 62 for connecting with the member 17 on the rear of the floor assembly 11, FIGS. 11 and 13. Specifically, the flanges 60 abut and are connected with the bracket 19 on the member 17, FIG. 11. The rear unit includes a frame 163 that is mounted, similarly, as is frame 33 of the front unit, onto three sets of tandem wheels 165 on each side. Referring to FIGS. 14 and 15, two pairs of wheels with axle 167 between each pair comprise each set. Two leaf springs 169 are secured to each axle 167 and to a frame member. Consequently, twelve wheels will be located under each unit. The distance from the outer edge of one outer wheel to the outer edge of the other outer wheel is preferably the legal width of eight feet.

A plurality of cross members 171 are releasably fastened to the upper frame 25 of the forward unit 21 and to the frame 163 of the rear unit 23. Each cross member is an elongate rigid beam of rectangular tubing of length greater than the distance between the outer edges of the wheel 65. A typical length is about fourteen feet. Each cross member includes a rod 173 welded to the tubing upper surface. Rod 173 is supported above the upper surface of the rectangular tubing by three supports 175, of which the center support is the tallest. This creates a peak in rod 173 of maximum height in the center of the cross member. The outer ends of cross member 171 contain caps 177 that extend upwardly past the upper surface of the cross member tubing. The beams 13 of slab 11 rest in the space between the caps 177 and the begining of the rods 173, as illustrated in FIG. 15.

The four cross member 171 on each unit 21, 23 are adapted to be selectively connected to the units in both the loaded, or load, position and in the stored, or unloaded position. In the loaded position, the cross members are perpendicular to the longitudinal axis of the units, shown in FIGS. 1, 2, 11, 14, 15. In the load position, the cross members are spaced apart and bolted to the upper frame 25 of the forward unit 21 and to the frame 163 of the rear unit 23. Bolts 179 serve as mounting means for securing the cross members to the units in the load position.

In the stored position, as shown in FIGS. 12 and 13, the cross members 171 on the front unit 21 are placed in contact with each other and bolted to the upper frame 25 parallel to the longitudinal axis of the frame 25. One end of each cross member is inserted through the opening 61 in the vertical plate 59. Opening 61 is of a height less than the height of the cross member 171 at the peak of its rod 173, thus the cross members can not slid forward should a sudden stop be required, even if the restraining force of the mountings would otherwise be exceeded. The cross members 171 are mounted in the stored positions by band 181, 183, FIG. 12, that are inserted over the cross members and are bolted to the upper frame 25.

The four cross members of the rear unit 23 are also placed parallel to the longitudinal axis while they are in this stored position. They are secured by bands 185, 187 which are bolted to the frame 163. One end of each cross member is in substantial contact with the vertical plate 164 to prevent forward movement should a sudden stop occur. The plate 164 is located at the forward end while in the stored position, since the trailer is towed in reverse for empty trips. Bands 181, 183, 185 and 187 along with their associated bolts and holes serve as the mounting means for mounting the cross members in the stored position. These bands and bolts 179 which mount the cross members 171 in the load position serve as conversion means for selectively shifting the cross members 171 between the stored position and the load position.

In the load position, as shown in FIG. 11, the front unit 21 and the rear unit 23 are connected together by a cable or chain 189 that extends from frame 163 of the rear unit 23 to the frame 25 of the front unit 21. The chain is tensioned against floor assembly 11 by a boom 191. Although shown as a single chain, a plurality of chains can be employed to meet regulatory requirements, for safety and the like.

In the stored position, as shown in FIGS. 12 and 13, the two means for towing the rear unit 23 comprises a tongue 193. Tongue 193 has a hitch 195 on its end for connection to the rear end of the front unit 21. Tognue 193 fits telescopingly in frame 163 on the same end of the rear unit 23 as the vertical plate 164. Tongue 193 can be inserted into the frame structure so that its hitch 195 is substantially flush with the end of the rear unit 23 for the load position.

In operation, the floor assembly 11 is poured with the respective cables installed. Following pouring curing, the cables are post-tensioned as described hereinbefore and the floor assembly lifted into a position for being jacked upwardly for loading onto the trailer assembly.

The member 17 is connected in place and the jacks 15 are assembled and connected by emplacing the respective nuts and bolts 93 and 89 through the respective flanges 80, 91, 81 and 85 of the jack. Expressed otherwise, the base of the jack is attached to the floor assembly 11 by way of the interconnection means 79 comprising the tab 81 with suitable bolt 93 with nuts screwed thereonto in conventional fashion. Thereafter, the top fastening means are emplaced at a given station such as the top of superstructure. The jack is then emplaced between the lifting means which is held against the the top fastening means and the force pad means 105 of the leg means 65. The jacking force is exerted to extend the leg more than the distance between the respective stations. Thereafter, the bottom fastening means 69 is inserted through the aperture 103 at an appropriate location on the leg means 65. The jack means is released to allow the base 73 to settle onto the bottom fastening means 69. Thereafter, the lifting means 64 is emplaced at a new station and the top fastening means emplaced at the new station. Again the jacking operation is repeated to force the leg means downwardly more than the distance between the apertures 97, 99 and the cycle is repeated.

Specifically, the bottom fastening means 69 is again inserted through the apertures 103 in the base and floor assembly 11 allowed to rest thereon while the lifting means 64 and the top fastening means 67 are moved downwardly to a new station and the jacking force repeated.

It is apparent through a series of such jacking maneuvers, operable by a single indivual workman if necessary, each corner of the floor assembly 11 can be raised with the jacks to the desired height. The desired height may be sufficient to allow the floor and frame assembly to be emplaced above walls or the like. For example, the jack's superstructure may be of lengths up to eight feet or more and the legs may be made in the length of up to eight feet or more such that a possible height of sixteen feet or more can be obtained in raising modular floor and frame systems for building rapidly. One of the advantages of this invention is that the jacks 15 extend beyond the exteriormost dimensions of the floor assembly such that the floor assembly can be emplaced at the desired height and thereafter walls such as prefab panels, and the like emplaced beneath the floor. After the walls are finished, the prefab floor can be lowered onto the top of the walls and affixed, by any suitable means such as welding, bolting or the like. In this way, modular construction can be finished rapidly without requiring expensive cranes or the like.

At least, the floor assembly will be raised to a height sufficient to emplace the trailer assembly thereunder.

In order to transport the jacked up floor assembly 11, cross members 171 are bolted transversely to the frames of the respective units and the units are maneuvered into position beneath the floor assembly 11. The jacks are then lowered to lower the floor assembly 11 onto the cross member 171. The jacks 15 are compacted and left attached as shown in FIG. 1. Thereafter the chain 189 is tensioned to draw the vertical plates 59, 164 tightly against the front and the rear edges of the floor assembly 11. Respective flanges 60, 19 are connected together by bolts to connect the floor assembly and trailer assembly into an integral unit to comply with regulations and for safety.

The nut 57 of the compression device on the front unit 21 is loosened sufficiently for the ring to be connected to the trailer hitch means of the towing vehicle. Once in place, the nut is tightened, compressing springs 55 and applying weight to the rear of the towing vehicle. Once the desired weight has been applied for proper traction, the unit can be locked into place. In the preferred embodiment, the compression device is capable of applying about eight thousand pounds of weight onto the rear of the towing vehicle.

While towing to the site, the wheel 165 of the front unit are free to turn for steering with respect to the slab for turning corners. Also ring 41 of the tongue 39 allows the tractor to turn with respect to the front unit. Once at the site, the jacks are used to raise the slab from the front and rear units. Chain 189 is discontinued and forward unit 21 is removed by pulling forwardly. The rear unit is removed by pulling rearwardly, using the telescoping tongue 193. The floor 11 is then lowered until its beam 13 rest on the ground.

For returning at legal width, the cross member 171 are removed from the load position and placed on the front and rear units as shown in FIGS. 12 and 13. The bands 181, 183, 185 and 187 are bolted over the cross members to secure them to the frames 25 and 163. The telescoping tongue 193 is hitched to the rear end of the front unit 21. The trailer assembly now of legal width, can be towed back to the place of departure. Note that in the empty return trip, the rear unit is towed reversed to the relative direction of travel while loaded.

In FIG. 16, the floor assembly 11 is shown being moved laterally, indicated by arrows 197. This arrangement can be used in places where insufficient room exists for forward and rearward maneuvering movement. In this arrangement, front unit 21 is identical to the front unit used in the embodiment of FIGS. 1, 2. Moreover, the rear unit 23 is also a front unit. It has an upper frame 25' that is rotatable with respect to the lower frame 33'. Specifically the lower frames of both units can be pivoted more than 90° in either direction from the straight ahead direction to allow flexibility in maneuvering. As illustrated, each unit has 360° of relative pivotal movement to accomodate positioning on the right or left without having to pre-select a particular unit.

The units are boomed together by a chain 189 extending between their upper frames. During normal towing the tongue 39' can be removed from the rear unit 23', if desired. It is frequently useful, however, to the respective forwardly and rearwardly protruding tongues 39 and 39' so that the trailer and floor assembly can be towed in either direction. The pins can be inserted in the holes 37 and tabs 35, FIG. 2 to lock the upper and lower frames 25' and 33' of the rear unit together during normal towing. When at the site, the pins 37 can be removed and the hitch 39' attached. The wheels can be turned at least 90° with respect to the floor assembly by use of a winch line. A second truck or other moving means can be used to push or pull the floor assembly 11 laterally in cooperation with the tractor connected to the front unit. Once in place, the front and rear units are removed as previously explained.

In place of a hitch, or tongue 39' for the alternate embodiment, a hydraulic cylinder could be used for turning the wheels on rear unit 23'. The rear unit could then be pulled laterally by winching rather than by using the second tractor.

The load bearing surfaces of the tires of the trailer assembly are varied depending on the load and the conditions of use. One of the advantages of this invention is that the multiple wheels allow low ground loading for off-highway transportation. For example, wide tires can be employed to give very low bearing surface stress.

This invention is useful in that the floor assembly, too, allows compensating for unstable soil. The floor assembly provides a sealed, insulated space where respective heating and cooling capabilities can be stored. Specifically, air can be blown under the trailer house to create a heat sink that can be used to supplement a small sized air conditioning unit during the hot part of the day. On the other hand, hot air can be blown to create a heat source that can be used to supplement heating of the modular home during the cold part of a winter day. If desired, the floor can be hermetically sealed by setting it on a plastic sheet to prevent moisture collection or the like.

If desired, copper lines can be employed to run hot water or the like beneath the floor, or top of the floor assembly, for storing heating capability such as by hot water flowing through the copper lines. Moreover heat loss through the floor is reduced as compared to a conventional trailer home, mobile home or the like. Also, the height of the respective end and longitudinally extending outside beams helps to keep the floor of the mobile home above a flood plane in certain areas, such as the hundred year flood plane required by certain regulatory agencies.

From the foregoing it can be seen that this invention is widely useful for effecting economical housing, either single module or combination modular form. Moreover, the combination of the floor assembly or one or both of the jacks and trailer assembly accomplish the respective objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. In a combination that includes:
   A. a jack capable of raising a floor assembly from ground level height to a predetermined height, including:
   a. a superstructure that includes:
   i. a base adapted to sit on ground level and at such other heights as desired to be connected to the floor assembly; the base having a passageway for downward passage of a leg means therethrough; the base slideably encompassing the leg means;
   ii. a structurally strong member having a plurality of stations at a plurality of respective predetermined heights in operation for preventing movement of a lifting means upwardly along the member past a respective station when a top fastening means is emplaced at a respective station;

b. a lifting means for lifting the superstructure and a floor assembly when attached thereto; the lifting means being movable longitudinally of the member of the superstructure;

c. top fastening means for fastening the lifting means so as to prevent movement upwardly past a predetermined station on the superstructure;

d. extensible leg means for extending downwardly from the superstructure; the leg means being slideably disposed in the passageway through the base; the leg means having a plurality of stations at a plurality of respective heights therealong; the leg means having a force pad means for receiving a jacking force;

e. bottom fastening means for fastening the base so as to prevent movement of the base downwardly along the leg means past a predetermined station at which the bottom fastening means is placed; the bottom fastening means being adapted to prevent downward movement of the base past the predetermined station at which the bottom fastening means is affixed; the top and bottom fastening means being alternately operable to a plurality of different stations for jacking up the floor assembly to the predetermined height;

f. jacking means for effecting raising of the floor assembly; the jacking means being adapted to be positioned between the force pad means of the leg means and the lifting means for applying the jacking force to force the lifting means and the force pad means apart longitudinally of the superstructure;

B. a trailer assembly for carrying the floor assembly, including:

a. a front unit having a lower frame mounted on a plurality of wheels;

b. an upper frame rotatably mounted to the lower frame so as to allow the wheels and lower frame to be turned efficiently to allow the front unit to be moved laterally for movement into a close space and at least 90° in either direction with respect to straight ahead and with respect to the upper frame assembly;

c. a tongue connected to the lower frame and having a hitch means for connection to a towing vehicle;

d. a rear unit having a frame mounted on a plurality of wheels; the rear unit being capable of being moved independently of the front unit;

e. a plurality of cross members mounted to the upper frame of the front unit and the frame of the rear unit;

f. conversion means for selectively shifting the cross members between a load position in which ends of the cross members protrude beyond the edges of the wheels for supporting the floor assembly even when overwidth and a storage position in which the ends do not extend past the outer edges of the wheels for trips when empty;

g. front and rear laterally disposed flanges on the respective upper frame of the front and rear units at the respective front and rear portions thereof to move against the respective front and rear of the floor assembly; and h. tow means for towing the rear unit with the front unit on empty trips;

the improvement comprising:

C. a prefabricated floor assembly adapted for prefabrication at a first location and transportation to a second and subsequent location comprising integrally precast:

a. a substantially planar top having length and width of predetermined dimensions and having a plurality of laterally extending beams spaced along its length;

b. at least two main longitudinally extending beams intergrally connected to said top and laterally extending beams, said two longitudinally extending beams having substantially uniform height throughout their length, located at the outside width of said top, and extending below said top and laterally extending beams so as to be set on level ground and define a space below said top and laterally extending beams without requiring additional underpinning and the like;

c. at least two end beams integrally connected to said top; said two end beams having said substantially uniform height throughout their length and located at the outside length of said top and intersecting said main longitudinally extending beams so as to define a peripheral underpinning when set on level ground and define a space between said top and said laterally extending beams and the top of the ground;

d. a plurality of longitudinally extending tensioning cables embedded in said longitudinal beam; said cables sloping downwardly in the center before said beams are cast and cured so as to be tensioned to support the center of said floor assembly when the respective ends thereof are lifted and carried;

e. first portion of jack interconnection means for connecting said jack, said first portion of said jack interconnection means being connected with said floor assembly adjacent each corner of each of the ends of said floor assembly;

f. second portion of jack interconnection means on the superstructure of the jack for connecting said superstructure with said floor assembly; said second portion of said jack interconnection means being connected to said superstructure and having means for removeably connecting with said floor assembly;

g. first portion of trailer interconnection means for connecting with said trailer assembly, said first portion of said trailer interconnection means being connected with said floor assembly adjacent each end of said floor assembly; and h. second portion of trailer interconnection means disposed on the trailer at the front and rear flanges for fastening to the first portion of said trailer interconnection means on the respective ends of the floor assembly, the respective front and rear being determined by the particular direction of towing;

whereby said floor assembly can be raised by extension of said leg means through at least one cycle of fixing said lifting means and jacking downwardly on said leg means.

2. The combination of claim 1 wherein said jack has as its said member two longitudinally extending members that are connected together across the top for stability and to maintain the same distance apart; said two member have matching apertures defining each said station and said top fastening means comprises two pin means for pinning through said apertures at a selected said station; said pin means extending past the member so as to prevent upward movement of said lifting means past said station; said lifting means has two passageways encompassing respective said members of said superstructure and said second portion of said jack interconnection means includes a laterally extending structural tab with apertures for receiving bolt means and bolt means connecting said tab with said floor assembly.

3. The combination of claim 1 wherein said jacking means includes a hydraulic ram for forcing said force pad and said lifting means apart.

4. The combination of claim 1 wherein said jack leg means has disposed that its bottom end a foot means for spreading the area bearing the load of said floor assembly; said foot means and said base being adapted and fitted such that said base can be attached to said floor assembly with said foot at ground level.

5. The combination of claim 1 wherein said trailer assembly includes a tongue that comprises two legs converging together at the hitch means, and wherein the compression means comprises:
 a. a transverse member extending across the legs and having an aperture therethrough;
 b. a beam rigidly connected to the lower frame and extending forwardly below the transverse member;
 c. a threaded rod connected to the beam and extending upwardly through the aperture;
 d. a plate having an aperture therethrough inserted over the rod above the transverse member;
 e. a coil spring mounted between the plate and the transverse member; and
 f. a nut threaded to the rod above the plate, whereby rotation of the nut increases and decreases the distance between the plate and the beam, increasing and decreasing the force required to lift the tongue.

6. The combination according to claim 1 wherein the rear unit contains an upper frame and a lower frame rotatably secured together and with the wheels attached to the lower frame so that the lower frame and attached wheels can turn sufficiently to allow the trailer assembly and any load to be moved laterally into close spaces and at least 90° in any direction from a straight ahead with respect to the upper frame, allowing the load to be laterally moved into place, the rear unit containing locking means for selectively preventing turning during towing on the road.

7. The combination of claim 6 wherein said rear unit is the same as said front unit and each has its respective tongue to enable towing forwardly and rearwardly.

8. The combination of claim 1 wherein said trailer has a tongue that is hingedly attached to the lower frame and further comprises compression means mounted between the tongue and lower frame for urging the tongue downwardly to apply weight to the rear of the towing vehicle from traction.

9. The combination of claim 1 wherein the cross members taper in height from the ends to a peak in the center, and wherein the front vertical plate has an aperture therethrough for receiving one end of the cross members on the front unit in the storage position, the aperture being of less height than the peak of the cross members so as to prevent forward movement of the cross members should the towing vehicle be quickly stopped, the rear vertical plate preventing forward movement of the cross members on the rear unit.

10. The combination of claim 1 wherein said floor assembly includes first set of bolt and nut means for post cast tensioning said cables and includes a second set of bolts at each corner for affixing said jack means and for affixing a high strength member having said first portion of said trailer interconnection means; said first portion of said trailer interconnection means comprising tabs extending outwardly from said high strength member with apertures for receiving respective bolts for connection with said trailer assembly.

11. The combination of claim 1 wherein said cables are post-cure tightened in tension after said floor has cured a sufficient predetermined interval of time.

12. The combination of claim 1 wherein said cables are prestressed and said stress is released onto said beams after said floor has cured a sufficient time.

13. In a combination that includes:
 A. a jack capable of raising a floor assembly from ground level height to a predetermined height, including:
  a. a superstructure that includes:
   i. a base adapted to sit on ground level and at such other heights as desired to be connected to a floor assembly; the base having a passageway for downward passage of a leg means therethrough; the base slideably encompassing the leg means;
   ii. a structurally strong member having a plurality of stations at a plurality of respective predetermined heights in operation for preventing movement of a lifting means upwardly along the member past a respective station when a top fastening means is emplaced at a respective station;
  b. a lifting means for lifting the superstructure and a floor assembly when attached thereto; the lifting means being movable longitudinally of the member of the superstructure;
  c. top fastening means for fastening the lifting means so as to prevent movement upwardly past a predetermined station on the superstructure;
  d. extensible leg means for extending downwardly from the superstructure; the leg means being slideably disposed in the passageway through the base; the leg means having a plurality of stations at a plurality of respective heights therealong; the leg means having a force pad means for receiving a jacking force;
  e. bottom fastening means for fastening the base so as to prevent movement of the base downwardly along the leg means past a predetermined station at which the bottom fastening means is placed; the bottom fastening means being adapted to prevent downward movement of the base past the predetermined station at which the bottom fastening means is affixed; the top and bottom fastening means being alternately operable to a plurality of different stations for jacking up the floor assembly to the predetermined height;
  f. jacking means for effecting raising of the floor assembly; the jacking means being adapted to be positioned between the force pad means of the leg means and the lifting means for applying the jacking force to force the lifting means and the force pads means apart longitudinally of the superstructure;
 the improvement comprising:

B. a prefabricated floor assembly adapted for prefabrication at a first location and transportation to a second and subsequent location comprising integrally precast:
  a. a substantially planar top having length and width of predetermined dimensions and having a plurality of laterally extending beams spaced along its length;
  b. at least two main longitudinally extending beams integrally connected to said top and laterally extending beams, said two longitudinally extending beams having substantially uniform height throughout their length, located at the outside width of said top, and extending below said top and laterally extending beams so as to be set on level ground and define a space below said top and laterally extending beams without requiring additional underpinning and the like;
  c. at least two end beams integrally connected to said top; said two end beams having said substantially uniform height throughout their length and located at the outside length of said top and intersecting said main longitudinally extending beams so as to define a peripheral underpinning when set on level ground and define a space between said top and said laterally extending beams and the top of the ground;
  d. a plurality of longitudinally extending tensioning cables embedded in said longitudinal beams; said cables sloping downwardly in the center before said beams are cast and cured so as to be tensioned to support the center of said floor assembly when the respective ends are lifted and carried.
  e. first portion of jack interconnection means for connecting a jack, said first portion of said jack interconnection means being connected with said floor assembly adjacent each corner of each of the ends of said floor assembly;
  f. second portion of jack interconnection means on the superstructure of the jack for connecting said superstructure with said floor assembly; said second portion of said jack interconnection means being connected to said superstructure and having means for removeably connecting with said floor assembly; and
  g. first portion of trailer interconnection means for connecting with a trailer assembly, connected with said floor assembly adjacent each end; and
whereby said floor assembly can be raised by extension of said leg means through at least one cycle of fixing said lifting means and jacking downwardly on said leg means and fastening said superstructure along said leg means.

14. In a combination that includes:
A. a trailer assembly for carrying a floor assembly, including:
  a. a front unit having a lower frame mounted on a plurality of wheels;
  b. an upper frame rotatably mounted to the lower frame so as to allow the wheels and lower frame to be turned efficiently to allow the front unit to be moved laterally for movement into a close space and at least 90° in either direction with respect to straight ahead and with respect to the upper frame assembly;
  c. a tongue connected to the lower frame and having a hitch means for connection to a towing vehicle;
  d. a rear unit having a frame mounted on a plurality of wheels; the rear unit being capable of being moved independently of the front unit;
  e. a plurality of cross members mounted to the upper frame of the front unit and the frame of the rear unit;
  f. conversion means for selectively shifting the cross members between a load position in which the ends of the cross members protrude beyond the edges of the wheels for supporting said floor assembly even when overwidth, and a storage position in which the ends do not extend past the outer edges of the wheels for trips when empty;
  g. front and rear laterally disposed flanges on the respective upper frame of the front and rear units at the respective front and rear portions thereof to move against the respective front and rear of said floor assembly; the respective front and rear being determined by the particular direction of towing; and
  h. tow means for towing the rear unit with the front unit on empty trips;
the improvement comprising:
B. a prefabricated floor assembly adapted for prefabrication at a first location and transportation to a second and subsequent location comprising integrally precast:
  a. a substantially planar top having length and width of predetermined dimensions and having a plurality of laterally extending beams spaced along its length;
  b. at least two main longitudinally extending beams integrally connected to said top and laterally extending beams, said two longitudinally extending beams having substantially uniform height throughout their length, located at the outside width of said top, and extending below said top and laterally extending beams so as to be set on level ground and define a space below said top and laterally extending beams without requiring additional underpinning and the like;
  c. at least two end beams integrally connected to said top; said two end beams having said substantially uniform height throughout their length and located at the outside length of said top and intersecting said main longitudinally extending beams so as to define a peripheral underpinning when set on level ground and define a space between said top and said laterally extending beams and the top of the ground;
  d. a plurality of longitudinally extending tensioning cables embedded in said longitudinal beams; said cables sloping downwardly in the center before said beams are cast and cured so as to be tensioned to support the center of said floor assembly when the respective ends thereof are lifted and carried;
  e. first portion of jack interconnection means for connecting said jack, said first portion of said jack interconnection means being connected with said floor assembly adjacent each corner of each of the ends of said floor assembly;
  f. first portion of trailer interconnection means for connecting with said trailer assembly, said first portion of said trailer interconnection means being connected with said floor assembly adjacent each end of said floor assembly; and g. second portion of trailer interconnection means for fastening to the first portion of said trailer interconnection means on said respective ends of said floor assembly, the respective second portion of said trailer interconnection means being connected with the front and rear flanges, respectively, of the respective front and rear units of said trailer assembly.

* * * * *